United States Patent [19]

Ippen et al.

[11] 4,037,635
[45] July 26, 1977

[54] PUNCTURE-PROOF TIRES

[75] Inventors: Jakob Ippen, Leverkusen-Steinbuechel; Friedel Stüttgen, Cologne, both of Germany

[73] Assignee: Bayer Aktiengesellschaft, Leverkusen, Germany

[21] Appl. No.: 640,788

[22] Filed: Dec. 15, 1975

[30] Foreign Application Priority Data

Dec. 19, 1974  Germany .............................. 2460050

[51] Int. Cl.² ............................................... B60C 7/08
[52] U.S. Cl. .................................... 152/301; 152/326
[58] Field of Search ............... 152/301, 302, 303, 306, 152/307, 308, 323–329

[56] References Cited

U.S. PATENT DOCUMENTS

| 697,033 | 4/1902 | Stein | 152/329 |
|---|---|---|---|
| 1,257,204 | 2/1918 | Ernenwein | 152/301 |
| 1,493,190 | 5/1924 | Davis | 152/301 |
| 1,617,870 | 2/1927 | Snider | 152/326 |
| 1,678,631 | 7/1928 | Barker | 152/326 |
| 2,742,941 | 4/1956 | Johnson | 152/326 |

*Primary Examiner*—Drayton E. Hoffman
*Attorney, Agent, or Firm*—Connolly and Hutz

[57] ABSTRACT

A puncture proof vehicle tire comprising two symmetrical halves mounted on a divided felly, wherein the tread and the foot of each tire half are connected by a resilient, reinforcing connecting portion which comprises a plurality of supporting members having been formed by axial cut-outs. It is preferred to arrange the axial cut-outs in such a way, that the supporting members of the connecting portion are segment-like and alternately arranged in opposite directions and thus in successive segments are orientated alternately towards the felly edge and the felly center.

5 Claims, 7 Drawing Figures

PUNCTURE-PROOF TIRES

The present invention relates to vehicle tires. The load bearing element of pneumatic vehicle tires is the carcass. This is basically a hollow body in the form of a torus of vulcanised rubber containing reinforcing elements (textile or steel cord filaments) which are capable of withstanding tensile stress. The hollow body is filled with air under pressure and its walls are under tensile stress. The weight of the vehicle counteracts this tension and partially compensates it. If such a tire ceases to be airtight and loses its internal pressure, then the compression caused by the weight of the vehicle predominates, the tire loses its shape and is quickly destroyed by the rolling motion.

Solid tires which do not contain compressed air as a cushioning element (solid ruber tires) do not suffer from this disadvantage. But to achieve this their mass is very large. In the course of the rolling motion accumulation of heat occurs leading to the destruction of the tire material.

The object of this invention is to provide a tire which does not have a hollow space filled with compressed air and which has a sufficiently small mass that no heat accumulates. Such a tire is puncture proof.

This object is achieved by providing air channels by means of axial cut-outs which greatly reduce the mass of the tire, thus achieving adequate cooling during running. By the logical arrangement of the cut-outs, reinforcing segments are formed between the tread of the tire and the tire foot which stabilise the tire sufficiently and afford it the necessary cushioning properties. For this purpose the tire consists of two symmetrical halves mounted on a divided felly.

According to the invention there is provided a vehicle tire comprising two symmetrical halves adapted to lie alongside one another when the tire is mounted on a wheel felly, each half having an outer positively curved tread surface, a continuous tire foot adapted to contact the felly, and a resilient, reinforcing connecting portion, the connecting portion comprising a plurality of supporting members having been formed by axial cut-outs.

According to a preferred embodiment of the invention there is provided a vehicle tire comprising two symmetrical halves adapted to lie alongside one another when the tire is mounted on a wheel felly, each half having an outer positively curved tread surface, a continuous tire foot adapted to contact the felly, and a resilient, reinforcing connecting portion, the supporting members of which are segment-like and alternately arranged in opposite directions, thus being orientated alternately towards the felly edge and the felly centre.

Novel features and advantages of the present invention will become apparent to one skilled in the art from a reading of the following description in conjunction with the accompanying drawings wherein similar reference characters refer to similar parts and in which.

Figure 1:
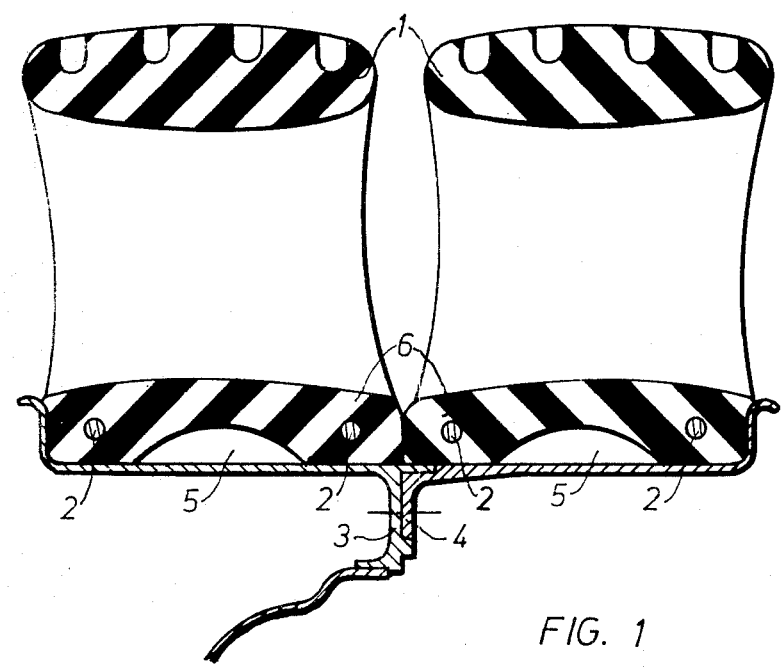
FIG. 1 is a cross-sectional view taken through FIG. 2 along the line 1—1.

FIG. 1 is a cross-section through a tire mounted on a felly according to the present invention. The reinforcing cushioning elements and/or the axial cut-outs which greatly reduce the total mass of the tire and assure adequate cooling during running are located between a positively curved tread 1 and the tire foot 6 optionally provided with an indentation 5 of the two symmetrical halves of the tire. The tire is mounted on a two-part 3,4 felly. The tire is held on the felly by the outer rim of the felly and two reinforcing wire-cores 2 in each of the tire feet, supporting one another inside.

Figure 2:
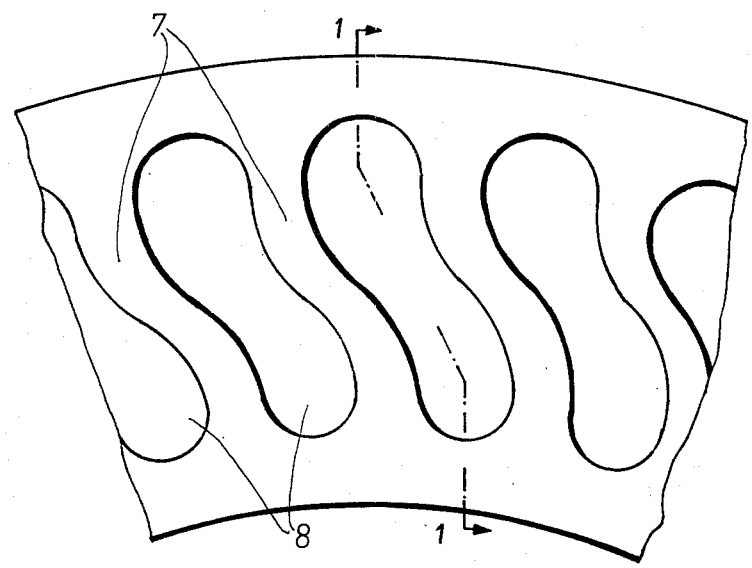
FIG. 2 is a partial side view in elevation of a tire which is one embodiment of this invention.

FIG. 2 shows a portion of the side view of the tire, in which the reduction of mass is achieved by regular consecutive cut-outs 8, so that radial wave-shaped reinforcing elements 7 are created between the tire foot 6 and the tread 1, which act as cushioning elements.

Figure 3:
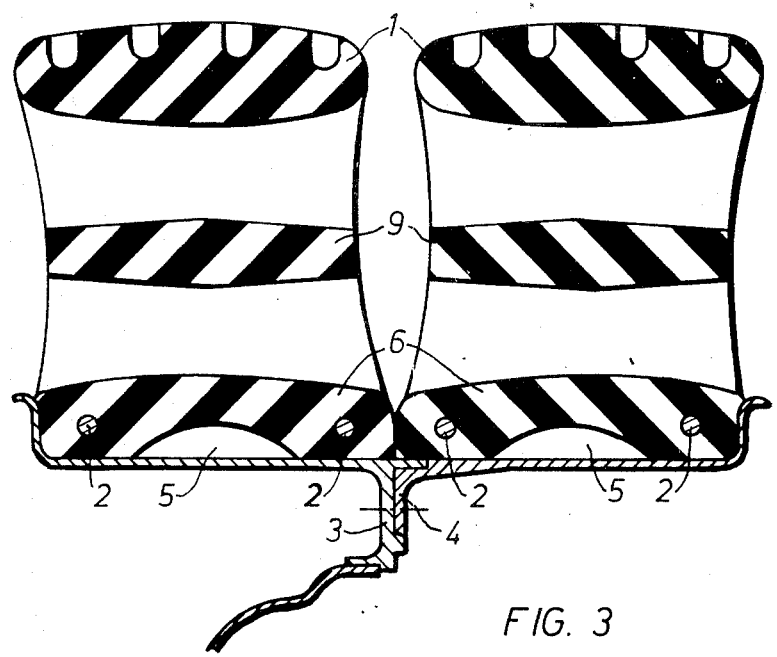
FIG. 3 is a cross-sectional view taken through FIG. 4 along the line 3—3.
Figure 4:
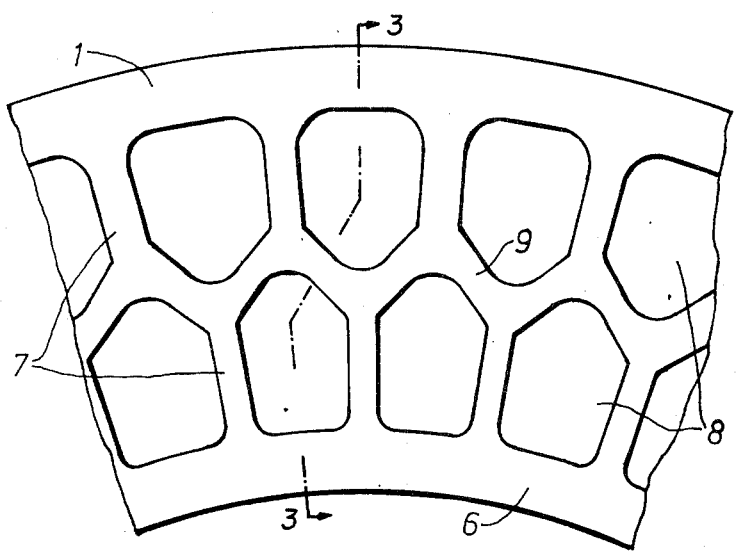
FIG. 4 is a partial side view in elevation of a tire which is another embodiment of this invention.

FIG. 3 shows the cross-section of another type of tire shape in accordance with the present invention. The tire, consisting of two symmetrical halves, is mounted on a two-part felly, 3,4. A crosspiece 9 is located between the positively curved tread 1 and the tire foot 6 with two reinforcing wire cores 2 and the indentation 5, present as applicable. This crosspiece can be clearly seen in FIG. 4, which shows a portion of the side view of the tire. By means of the appropriate arrangement of the axial cut-outs 8 staggered reinforcing parts 7 are formed which are connected by an axial wave-shape cross-piece 9 so that a net-like structure is formed between the tread 1 and the tire foot 6, which acts as a cushioning element.

Figure 5:
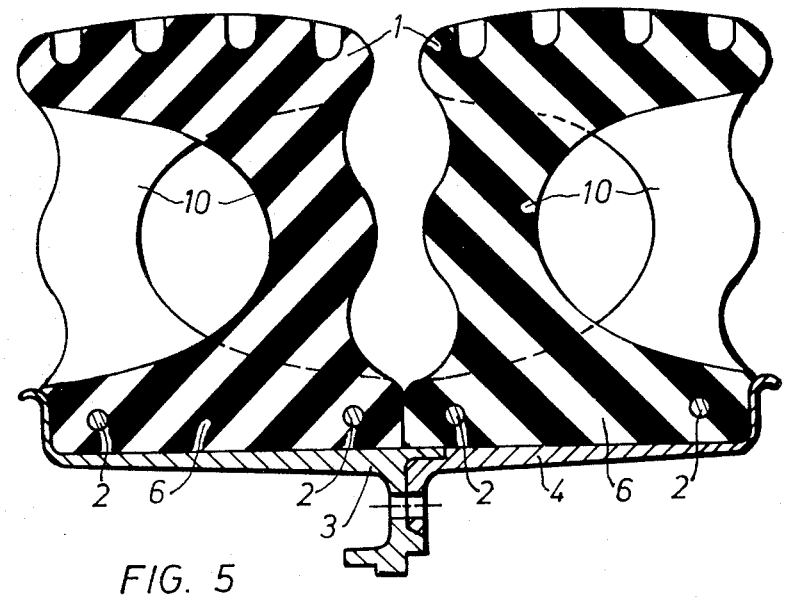
FIG. 5 is a cross-sectional view taken through FIG. 6 along the line 5—5.

A preferred form for the tire according to the invention is shown in FIG. 5 in cross-section. The form and arrangement of the axial cut-outs are so selected that the symmetrical halves of the tire are divided into opposed segments composed of a positive-curved tread section 1, a foot 6 reinforced by two wire cores 2 and a cushioning, optionally asymmetrical connecting section 10, which in the consecutive segments is oriented alternately towards the edge and the centre of the two-part 3,4 felly.

Figure 6:
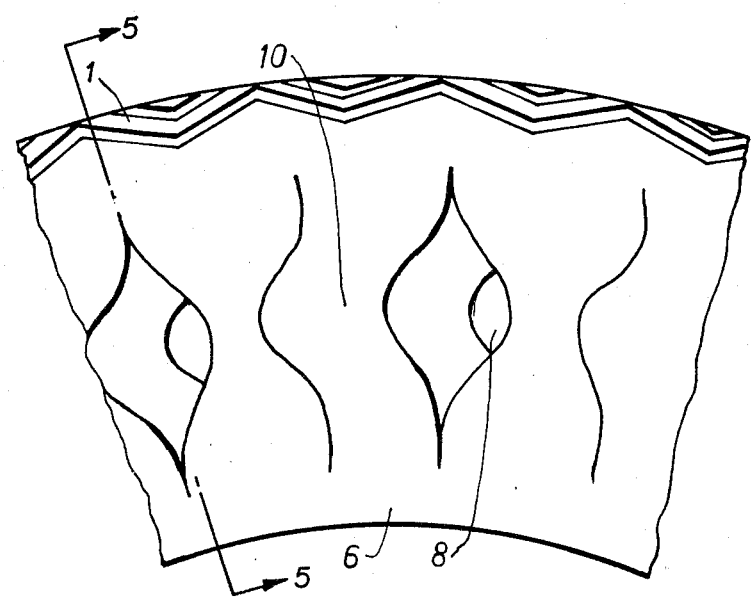
FIG. 6 is a partial side view in elevation of a portion of a tire which is a further embodiment of this invention.

FIG. 6 shows a portion of the side view of the tire. The tread 1 is connected to the tire foot 6 through the connecting section 10. 8 is one of the cut-outs in the tire i.e. a section of the air channels which give rise to the segment arrangement. Thus, the invention relates to a puncture proof tire mounted on a divided felly 3,4 which consists of two symmetrical parts, that are composed either of oppositely oriented segments, made up of a positive-curve tread section 1, a foot 6 and a cushioning, optionally asymmetrical connecting section 10, or which by virtue of an appropriate arrangement of the axial cut-outs 8 between the tread section 1 and foot 6 contain cushioning reinforcing parts 7, optionally connected by a crosspiece 9, whereby the tire feet each reinforced by two wire cores 2 and optionally provided with an indentation 5, support one another internally and are held externally by the felly rims.

The height-width ratio of the whole tire may be from 0.45 to 1.25, preferably from 0.5 to 0.7 i.e. the height: width ratio of a tire half is from 0.9 to 2.5, preferably from 1.0 to 1.4.

The tires of the invention may be manufactured from any natural or synthetic rubber whose vulcanisates a Shore A-hardness of from 55 to 90 and a tension value of from 110 to 200 kp/cm² at 300% elongation. Those which are especially suitable are natural rubber, styrene/butadiene rubber, polybutadiene and ethylene/propylene-terpolymerisate rubber.

The weight of the tires of the invention is only approximately 25 – 30% above that of comparable pneumatic tires. The properties of the tires can be influenced interalia by the number of reinforcing parts or segments. In general, each tire half has from 20 to 100 segments and preferably from 40 to 60 segments.

The tire of the invention can be manufactured as simple injection products by means of the transfer process. This requires only one operation. Apart from two wire rings in the tire foot no reinforcing elements are necessary. In comparison with pneumatic tires of a similar size, the felly diameter is somewhat larger. This permits larger brake drums next to the felly and thus better cooling of the brake surfaces.

EXAMPLE

Figure 7:
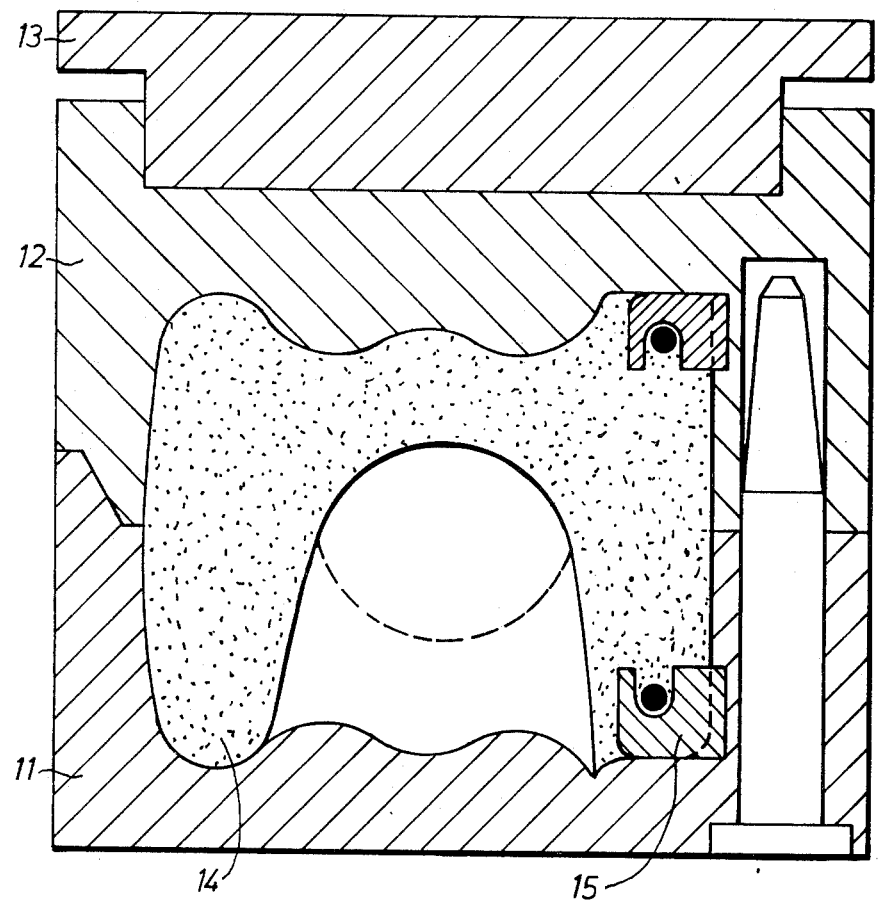
FIG. 7 is cross-sectional view taken through a mold in which a tire which is a further embodiment of this invention is being manufactured.

A tire is manufactured in a toroidal transfer mould. A section through this mould is shown in FIG. 7. 11 is the lower mould half, 12 is the upper mould half 13 is the pressure piston, 14 the inside of the mould, 15 a rib arrangement to secure the wire rings.

First the wire rings are placed into the lower and upper mould halves and secured by means of the rib arrangement. A vulcanisable rubber mixture is poured into the upper mould half, the mould is closed and subjected to pressure by means of the piston 13 (approx 100 kg/cm²). The mould is then heated for 15 – 30 minutes at 145° to 175° C. After that the tire can be removed. The wire cores in the tire foot consist of solid, copper-plated steel wire. They are not — as they are in pneumatic tires — stressed for bending. The tire has 48 segments.

The tires are produced with the following rubber compounds:

| | |
|---|---|
| Natural rubber | 25.0 |
| Styrene/butadiene copolymer | 25.0 |
| cis-1.4-polybutadiene | 50.0 |
| Carbon black N-330 | 80.0 |
| Resin | 4.0 |
| Stearic acid | 2.0 |
| N-isopropyl-N'-phenyl-p-phenylenediamine | 2.5 |
| 2.2.4-trimethyl-1.2-dihydrochinoline, polymerised | 1.5 |
| Zinc oxide | 5.0 |
| Benzothiacyl-2-cyclohexylsulphene amide | 1.2 |
| Insoluble sulphur | 2.66 |
| | 198.86 |
| Mixing plasticity/80° C | |
| Defo-hardness/Defo-elasticity | 7700/17 |
| Tensile strength (kp/cm²) | 199 |
| Breaking elongation (%) | 310 |
| Tension at 300% elongation (kp/cm²) | 191 |
| Tear propagation resistance according to Pohle (kp/4mm) | 16 |
| Hardness (Shore A) at 20° C | 82 |
| Natural rubber | 80.0 |
| cis-1.4-polybutadiene | 20.0 |
| Carbon black N-330 | 55.0 |
| Aromatic mineral oil | 3.0 |
| Stearic acid | 2.5 |
| Ozone protective wax | 1.0 |
| N-isopropyl-N'-phenyl-p-phenylene diamine | 2.5 |
| 2.2.4-trimethyl-1.2-dihydrochinoline, polymerised | 1.5 |
| Zinc Oxide | 5.0 |
| Benzothiacyl-2-sulphene morpholide | 1.2 |
| Insoluble sulphur | 1.9 |
| | 173.6 |
| Mixing plasticity / 80° C | |
| Defo-hardness/Defo-elasticity | 1100/15 |
| Tensile strength (kp/cm²) | 219 |
| Breaking elongation (%) | 460 |
| Tension at 300% elongation (kp/cm²) | 130 |
| Tear propagation resistance according to Pohle (kp/4mm) | 37 |
| Hardness (Shore A) at 20° C | 66 |
| Oil-extended styrene-butadiene-copolymer | 68.5 |
| Oil-extended cis-1.4-polybutadiene | 68.5 |
| Carbon black N-220 | 95.0 |
| Aromatic mineral oil | 20.0 |
| Resin | 2.0 |
| Stearic acid | 2.0 |
| Ozone protective wax | 1.5 |
| N-isopropyl-N'-phenyl-p-phenylene diamine | 2.5 |
| 2.2.4-trimethyl-1.2-dihydrochinoline, polymerised | 1.5 |
| Zinc oxide | 3.0 |
| Benzothiacyl-2-cyclohexylsulphenamide | 1.5 |
| Tetramethylthiuramic mono sulphide | 0.2 |
| Insoluble sulphur | 2.4 |
| | 268.6 |
| Mixing plasticity / 80° C | |
| Defo-hardness/Defo-elasticity | 1550/16 |
| Tensile strength (kp/cm²) | 155 |
| Breaking elongation (%) | 410 |
| Tension at 300% elongation (kp/cm²) | 108 |
| Tear propagation resistance according to Pohle (kp/4mm) | 24 |
| Hardness (Shore A) at 20° C | 66 |

We claim:

1. A vehicle tire comprising two symmetrical halves adapted to lie alongside one another when the tire is mounted on a wheel felly, a continuous tire foot adapted to contact the felly, a resilient, reinforcing connecting portion, the connecting portion comprising a plurality of supporting members having been formed by axial cut-outs and the supporting members are segment-like and alternately arranged in opposite direction, thus being orientated alternately towards the felly edge and the felly centre.

2. A tire as claimed in claim 1, wherein the supporting members are asymmetrically shaped.

3. A tire as claimed in claim 1, wherein the height/width ratio of the whole tire is from 0.45 to 1.25, i.e. the height/width ratio of a tire-half is from 0.9 to 2.5.

4. A tire as claimed in claim 1, wherein the height/width ratio of the whole tire is from 0.5 to 0.7, i.e. the height/width ratio of a tire half is from 1.0 to 1.4.

5. A tire as claimed in claim 1 wherein the felly is a two-part felly.

* * * * *